United States Patent [19]

Wong et al.

[11] Patent Number: 5,070,184

[45] Date of Patent: Dec. 3, 1991

[54] TREATMENT OF CARBON MONOXIDE/OLEFIN COPOLYMER WITH SOLVENT

[75] Inventors: Pui K. Wong, Katy, Tex.; Eit Drent, Amsterdam, Netherlands

[73] Assignee: Shell Oil Company, Houston, Tex.

[21] Appl. No.: 522,701

[22] Filed: May 14, 1990

[30] Foreign Application Priority Data

Jul. 26, 1989 [NL] Netherlands .......................... 8901929

[51] Int. Cl.$^5$ .............................................. C08G 67/02
[52] U.S. Cl. ..................................... 528/491; 528/392; 528/480; 528/493; 528/494; 528/497; 528/498
[58] Field of Search ............... 528/491, 493, 494, 497, 528/498, 392, 480

[56] References Cited

U.S. PATENT DOCUMENTS 4,788,279 11/1988 Drent .................................. 528/392
4,798,884 1/1989 Brons et al. ........................ 528/491

*Primary Examiner*—Harold D. Anderson

[57] ABSTRACT

The relative average stereoregular character of a stereoregular linear alternating polymer of carbon monoxide and aliphatic α-olefin of at least 3 carbon atoms is enhanced by contacting a stereoregular linear alternating polymer with certain selective solvents and obtaining as a residue of such contacting a polymer of enhanced average stereoregular character.

8 Claims, No Drawings

TREATMENT OF CARBON MONOXIDE/OLEFIN COPOLYMER WITH SOLVENT

FIELD OF THE INVENTION

This invention relates to a method of obtaining a linear alternating polymer of carbon monoxide and an aliphatic α-olefin of at least 3 carbon atoms of enhanced average stereoregular character. More particularly, the invention relates to subjecting a stereoregular linear alternating polymer of carbon monoxide and an aliphatic α-olefin of at least 3 carbon atoms of relatively low stereoregular character to an extraction process to obtain as the residue a polymer of higher stereoregular character.

BACKGROUND OF THE INVENTION

The linear alternating copolymers of carbon monoxide and aliphatic α-olefins are known in the art, being produced by the processes disclosed in U.S. Pat. No. 4,788,279 and copending U.S. patent application Ser. No. 352,235, filed May 15, 1989, now U.S. Pat. No. 4,965,341. The copolymers are produced according to these references in the presence of a catalyst composition formed from a palladium compound, the anion of a strong non-hydrohalogenic acid and a bidentate ligand of nitrogen or certain cyclic bidentate ligands of phosphorus. The polymers are broadly represented by the repeating formula

—CO—(—G—)—   (I)

wherein G represents the moiety of the aliphatic α-olefin of at least 3 carbon atoms. In terms of the fine structure of such polymers, they are termed regioregular and stereoregular.

The term "regioregular" refers to the manner in which moieties derived from the α-olefin are connected to the moieties derived from the carbon monoxide. If the α-olefin moieties are attached to the carbon monoxide moieties in predominantly, e.g., at least 50% of the time, a head-to-tail manner, the polymer is termed regioregular. A polymer with less than a predominance of head-to-tail bonding is termed regio-irregular or non-regioregular. The term stereoregular applies to the configuration of the asymmetric carbon atoms of the linear alternating polymer. When the configuration of adjacent asymmetric carbon atoms is the same, e.g.,

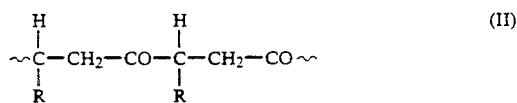

wherein R is alkyl and the wavy lines represent the continuing polymer chain, the configuration is termed syndiotactic and a polymer having a predominance of syndiotactic configurations, i.e., at least 50% of syndiotactic configurations, is considered to be a syndiotactic polymer. When the configuration of adjacent asymmetric carbon atoms is opposite, e.g.,

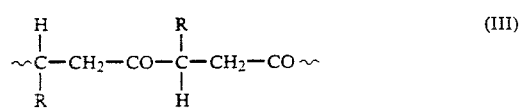

wherein R and the wavy line have the previously stated meaning, the configuration is termed isotactic and a polymer having a predominance of isotactic configurations is termed an isotactic polymer. Stereoregular polymers include those which are syndiotactic and those which are isotactic. A polymer in which there is no predominant or regular arrangement of adjacent asymmetric carbon atoms is termed atactic or stereo-irregular.

The production of linear alternating polymers of carbon monoxide and aliphatic α-olefin of at least 3 carbon atoms which are highly atactic is the subject of copending U.S. patent application Ser. No. 442,089, filed Nov. 28, 1989. However, the production of such linear alternating polymers which are highly stereoregular is not so easily accomplished. For some applications it is desirable to have a linear alternating polymer of carbon monoxide and aliphatic α-olefin of at least 3 carbon atoms which is entirely or predominantly atactic in character. For other applications it would be desirable to have such a linear alternating polymer high in stereoregular character, i.e., syndiotactic character or isotactic character. It would be of advantage to provide a method of obtaining a linear alternating polymer of carbon monoxide and aliphatic α-olefin of at least 3 carbon atoms of enhanced or greater stereoregular character.

SUMMARY OF THE INVENTION

The present invention provides a method of obtaining a stereoregular linear alternating polymer of carbon monoxide and aliphatic α-olefin of at least 3 carbon atoms of enhanced stereoregular character. More particularly, the present invention provides an extraction process whereby a stereoregular polymer having a relatively low degree of average stereoregular character is extracted with certain selective solvents to thereby obtain as a residue a stereoregular polymer of a higher degree of average stereoregular character.

DESCRIPTION OF THE INVENTION

The process of the invention comprises the extraction of a linear alternating copolymer of carbon monoxide and aliphatic α-olefin of at least 3 carbon atoms which is stereoregular, i.e., has a predominant arrangement of adjacent asymmetric carbon atoms which is the same or alternatively is different, but which has a relatively low degree of average stereoregular character. The extraction process serves to remove as an extract any atactic molecules present as well as those having lower degrees of stereoregular character. The residue of the extraction process is a stereoregular linear alternating polymer having an enhanced or higher degree of average stereoregular character.

The linear alternating polymer to which the process of the invention is applied is a linear alternating polymer of carbon monoxide and aliphatic α-olefin of at least 3 carbon atoms which is broadly represented by the above repeating formula I. The aliphatic α-olefin precursors of the linear alternating polymers are hydrocarbons having from 3 to 10 carbon atoms and are illustrated by propylene, 1-butene, isobutylene, 1-hexene and 1-decene. The preferred aliphatic olefin of at least 3 carbon atoms is propylene and the preferred linear alternating polymers are those of formula I wherein G represents a moiety of propylene. Such polymers are regioregular if the propylene moieties are attached to the carbon monoxide moieties in predominantly a headto-tail fashion. The polymers will be stereoregular if the configuration of the adjacent carbon atoms in the polymer is the same (isotactic) or opposite (syndiotactic). Such polymers are represented by the above formulas II and III respectively wherein R is methyl.

The stereoregular polymers are produced according to the teachings of U.S. Pat. No. 4,788,279 or the above copending application Ser. No. 352,235, U.S. Pat. No. 4,965,341 depending upon which type of stereoregular linear alternating polymer is desired. Both processes employ a catalyst composition formed from a palladium compound, the anion of a non-hydrohalogenic acid having a pKa of less than 2 and a bidentate ligand. The scope of the polymerization process is extensive but, without wishing to be limited, a preferred palladium compound is a palladium carboxylate, such as palladium acetate, and the preferred anion is the anion of trifluoroacetic acid or p-toluenesulfonic acid. Syndiotactic linear alternating polymers of carbon monoxide and aliphatic α-olefin of at least 3 carbon atoms are prepared according to U.S. Pat. No. 4,788,279 where the bidentate ligand is a bidentate ligand of nitrogen. In this case it is useful to employ in the mixture from which the catalyst composition is formed an organic oxidant such as a 1,4-quinone, e.g., 1,4-benzoquinone or 1,4-naphthoquinone. The corresponding isotactic polymers are produced according to the above copending application Ser. No. 352,235 U.S. Pat. No. 4,965,341. In this process the ligand is a cyclic bidentate phosphine ligand. A typical catalyst composition mixture contains from about 1 mole to about 100 mols of anion per nmole of palladium, from about 1 mole to about 50 moles of ligand per mole of palladium and, where employed, from about 10 moles to about 5000 moles of oxidant per mole of palladium.

The carbon monoxide and aliphatic α-olefin of at least 3 carbon atoms are contacted in a liquid reaction diluent in the presence of the catalyst composition and under polymerization conditions. Suitable reaction diluents include alkanols such as methanol or ethanol. Methanol is preferred. Typical polymerization conditions include a reaction temperature of from about 30° C. to about 150° C. and a pressure from about 2 bar to about 150 bar. The molar ratio of the aliphatic α-olefin to the carbon monoxide is from about 5:1 to about 2:1 and sufficient catalyst composition is used to provide from about $1 \times 10^{-6}$ mole to about $1 \times 10^{-4}$ mole of palladium per mole of aliphatic α-olefin of at least 3 carbon atoms.

Reactant contacting is facilitated by some means of agitation such as shaking or stirring. Subsequent to polymerization the reaction is terminated as by cooling the product mixture and releasing the pressure. The stereoregular polymer product is typically obtained as a material substantially insoluble in the reaction diluent and is recovered by conventional procedures such as filtration or decantation. The polymer product is employed directly in the process of the invention without the need for purification or alternatively is purified by treatment with a solvent or extraction agent selective for catalyst residues or by processes of dissolution followed by re-precipitation with a non-solvent.

The extraction process of the invention comprises contacting the stereoregular linear alternating copolymer of carbon monoxide and aliphatic α-olefin of at least 3 carbon atoms of relatively low average stereoregular character with a solvent selective for those components of the polymer mixture which are of little orno stereoregular character. The solvent serves to selectively dissolve and remove such components and the resulting residue is stereoregular polymer of enhanced or increased average stereoregular character. Illustrative of the solvents useful in the extraction process of the invention are ketones, particularly alkanones of up to 8 carbon atoms inclusive such as acetone, methyl ethyl ketone, ethyl propyl ketone, methyl isobutyl ketone and methyl hexyl ketone, cyclic ethers such as dioxane, tetrahydrofuran and dioxalone, aromatic hydrocarbons such as benzene, toluene and xylylene, halohydrocarbons such as chloroform, methylene chloride and perchloroethane, and aliphatic esters such as ethyl acetate, methyl butyrateand ethyl 2-ethylhexanoate. The preferred selective solvents are ketones and cyclic ethers and the class of methyl ethyl ketone, methyl isobutyl ketone and dioxane is particularly preferred.

The precise manner in which the extraction process is conducted is not critical and the extraction is conducted in one step or in a plurality of steps. In one illustrative embodiment, the extraction is with methyl ethyl ketone at or about ambient temperature. A second illustrative embodiment comprises extraction with boiling methyl isobutyl ketone followed by a second extraction with methyl ethyl ketone at or about ambient temperature. In a third illustrative embodiment the process comprises an initial extraction with methyl ethyl ketone and a subsequent extraction with dioxane as the selective solvent, each at or about ambient temperature. The particular time of contacting the stereoregular linear alternating polymer and the extracting agent is not critical and will depend upon the temperature of the extraction and the particular selective solvent employed. Typical extraction temperatures are those at which the selective solvent is liquid and in practice varies from at or about ambient temperature to the boiling temperature of the selective solvent. Typical extraction times are on the order of a few hours.

The polymer product of the process of the invention, obtained as a residue, is a stereoregular linear alternating polymer of carbon monoxide and aliphatic α-olefin of at least 3 carbon atoms of enhanced average stereoregular character when compared to the stereoregular character of the linear alternating polymer to which the process of the invention was applied. Thus, the process of the invention produces linear alternating carbon monoxide/aliphatic α-olefin of at least 3 carbon atoms copolymer of a higher degree of stereoregular character than the polymer produced directly by known methods. The polymer product is a thermoplastic and is processed by procedures known for thermoplastics, e.g., extrusion, injection molding or thermoforming, into a variety of shaped articles of established utility. Specific applications include containers for food and drink and parts and housings for automotive applications. The relatively high stereoregular character of the polymer product of the invention is often associated with greater crystallinity and higher melting points or glass transition temperatures. As such, the polymer product is particularly useful in he production of shaped articles likely to encounter elevated temperatures where dimensional stability is desired.

The invention is further illustrated by the following Illustrative Embodiments which should not be regarded as limitations.

ILLUSTRATIVE EMBODIMENT I

When a linear alternating copolymer of carbon monoxide and propylene is produced according to the disclosure of U.S. Pat. No. 4,788,279, the polymer is regioregular and stereoregular, specifically syndiotactic. When this polymer is extracted with methyl ethyl ketone at ambient temperature, the resulting residue is a linear alternating carbon monoxide/propylene copolymer of enhanced average syndiotactic character.

ILLUSTRATIVE EMBODIMENT II

When a linear alternating copolymer of carbon monoxide is produced according to the disclosure of copending U.S. patent application Ser. No. 352,235, filed May 15, 1989, the polymer is regioregular and stereoregular, specifically isotactic. When this polymer is extracted with boiling methyl isobutyl ketone and then with dioxane at ambient temperature, the resulting residue is a linear alternating carbon monoxide/propylene copolymer of enhanced average isotactic character.

What is claimed is:

1. A process for increasing the average syndiotactic character of a stereoregular linear alternating copolymer of carbon monoxide and aliphatic $\alpha$-olefin of at least 3 carbon atoms of relatively low stereoregular character by contacting the linear alternating polymer with a solvent selected from aromatic hydrocarbons or haloalkanes.

2. The process of claim 1 wherein the $\alpha$-olefin is propylene.

3. The process of claim 2 wherein the solvent is benzene, toluene, or xylene.

4. The process of claim 2 wherein the solvent is chloroform, methylene chloride, or perchloroethane.

5. A process for increasing the average isotactic character of a stereoregular linear alternating copolymer of carbon monoxide and aliphatic $\alpha$-olefin of at least 3 carbon atoms of relatively low stereoregular character by contacting the linear alternating polymer with a solvent selected from aromatic hydrocarbons or haloalkanes.

6. The process of claim 5 wherein the $\alpha$-olefin is proplylene.

7. The process of claim 6 wherein the solvent is benzene, toluene, or xylene.

8. The process of claim 6 wherein the solvent is chloroform, methylene chloride, or perchloroethane.

* * * * *